United States Patent [19]

Chen et al.

[11] Patent Number: 5,340,861

[45] Date of Patent: Aug. 23, 1994

[54] POLYPHENYLENE SULFIDE COMPOSITION WITH IMPROVED CRYSTALLIZING CHARACTERISTIC

[75] Inventors: Chi-Hwang Chen, Hsinchu; Chih-Cheng Chiang, Chung-Li Taoyuan; Bin-Yuan Lin; Rong-Hwa Chang, both of Hsinchu, all of Taiwan

[73] Assignee: Industrial Technology Research Institute, Hsinchu, Taiwan

[21] Appl. No.: 56,411

[22] Filed: May 3, 1993

[51] Int. Cl.$^5$ ................................................ C08K 5/42
[52] U.S. Cl. .................................... 524/166; 524/176; 524/451; 524/449; 524/609
[58] Field of Search ............... 524/166, 176, 609, 449, 524/451

[56] References Cited

U.S. PATENT DOCUMENTS

| | | | |
|---|---|---|---|
| 4,735,977 | 4/1988 | Bier et al. | 524/609 |
| 4,942,194 | 7/1990 | Bier et al. | 524/294 |
| 5,045,585 | 9/1991 | Bier et al. | 524/294 |
| 5,057,264 | 10/1991 | Bier et al. | 525/537 |
| 5,120,804 | 6/1992 | Inoue et al. | 525/537 |

FOREIGN PATENT DOCUMENTS

| | | |
|---|---|---|
| 3607713 | 9/1987 | Fed. Rep. of Germany . |
| 62-240359 | 10/1987 | Japan . |
| 63-245465 | 10/1988 | Japan . |
| 63-264666 | 11/1988 | Japan . |
| 2-182736 | 7/1990 | Japan . |

OTHER PUBLICATIONS

Monte, Salvatore, Ken-React Reference Manual—Titanate Zirconate & Aluminate Coupling Agents, Kannish Petrochemicals, 1985.

Primary Examiner—John C. Bleutge
Assistant Examiner—Mark D. Sweet
Attorney, Agent, or Firm—W. Wayne Liauh

[57] ABSTRACT

A rapidly crystallizing polyphenylene sulfide composition for reducing duration of injection molding cycle which comprises (a) a polyphenylene sulfide represented by the formula:

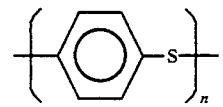

and (b) an organometallic compound represented by the formula:

$$R'-O-M-(Q-R'')_3$$

wherein M is either titanium or zirconium; R' is a substituted or un-substituted alkyl group having a carbon number of 1 to 30; Q is an SO$_3$ group and R" is an alkyl group having a carbon number of 1 to 25, or an arylalkyl group represented by the following formula:

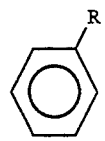

wherein R is an alkyl group having a carbon number of 1 to 25.

18 Claims, No Drawings

POLYPHENYLENE SULFIDE COMPOSITION WITH IMPROVED CRYSTALLIZING CHARACTERISTIC

FIELD OF THE INVENTION

This invention relates to polyphenylene sulfide composition with improved crystallizing characteristic. More particularly, this invention relates to polyphenylene sulfide compositions and composites made therefrom with lower crystallization time and higher crystallization temperature thus allowing a shorter injection molding cycle and lower production cost.

BACKGROUND OF THE INVENTION

Polyphenylene sulfide, or more particularly p-polyphenylene sulfide, is a highly crystalline polymeric resin with the following repeating unit:

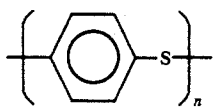

Polyphenylene sulfides are typically prepared by reaction between alkali metal sulfide and dihalogenated aromatics. Polyphenylene sulfides can be used directly in the production of coatings by slurry-coating procedures; however, the principal use thereof is as a feedstock for the production of various molding-grade resins. Polyphenylene sulfides are used in injection molding, compression molding, free sintering, and coating. By far, the largest fabrication technique in the production of polyphenylene sulfide products is injection molding.

Because of their high crystalline structure, polyphenylene sulfides possess a number of excellent properties, including high resistance to wear, advantageous creep rupture properties, and high dimensional accuracy. Polyphenylene sulfide resins are particularly suitable for making components for high mechanical stress and high temperature applications.

Difficulties have been encountered in the production of moldings from polyphenylene sulfide by injection molding. These difficulties are associated with the slow mobility of the polyphenylene sulfide molecular chain, resulting in undesirably low crystallization rate and long duration of injection molding cycle. Long injection molding cycle holds up production rate and adversely affects profitability.

In order to improve the profitability of using the polyphenylene sulfide resins, it is, therefore, particularly important to improve the crystallizing characteristic, i.e., to raise the crystallizing rate, of the polyphenylene sulfide polymers. Literature surveys show that two main types of techniques have been disclosed in the prior art to improve the crystallizing rate of the polyphenylene sulfide polymers. In one type of technique, which is disclosed in Japanese Pat. App. Nos. S-63-245463, S-63-264666, P-2-182736, German Pat. No. DE-3,607,713, it was suggested adding silicon oxide, kaolin, talc, or xylene-biscarboxylic acid amide as nucleating agent to increase the crystallizing rate of polyphenylene sulfide. In another type of technique, which is disclosed in German Pat. No. DE-3,841,022, U.S. Pat. No. 5,057,264, and Japanese Pat. App. No. S-62-240359, it was suggested adding phenolic resin, polyester oligomer, or polyphenylene sulfide polymers of different molecular weight to increase the crystallization temperature thereof.

Because of its unique combination of properties, polyphenylene sulfide is finding increased demands and applications, particularly in the electrical and electronic industries. Although improvements have been made regarding the fabricability thereof, mainly to reduce the duration of the injection molding cycle, additional efforts are still required to further increase the crystallizing rate of polyphenylene sulfide to thus bring the cost of polyphenylene sulfide products to a more acceptable level.

SUMMARY OF THE INVENTION

The primary object of the present invention is to develop a rapidly crystallizing polyphenylene sulfide composition, or composites made therefrom, so as to reduce the duration of the injection molding cycle and thus the cost of manufacturing therefor.

The present invention discloses a polyphenylene sulfide composition, or its composite, which contains an organometallic compound, such as zirconium organometallic compound or titanium organometallic compound, as a crystallizing aid to improve the rate of crystallization thereof. The organometallic compound disclosed in the present invention is represented by the following formula:

$$R'-O-M-(Q-R'')_3$$

wherein M can be either titanium or zirconium;
R' is a substituted or un-substituted alkyl group having a carbon number of 1 to 30;
Q is an $SO_3$ group; and
R'' is an alkyl group having a carbon number of 1 to 25, or an alkyl-aryl group represented by the following formula:

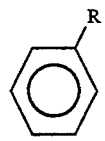

wherein R is an alkyl group having a carbon number of 1 to 25.

Preferred examples of R' are listed below:

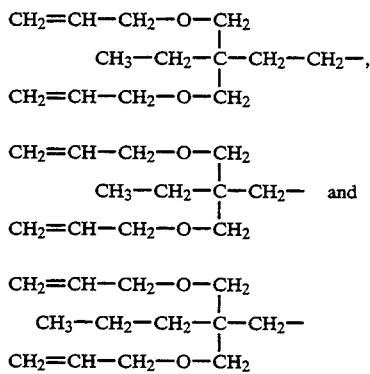

In the composition disclosed in the present invention, the amount of the titanium or zirconium organometallic compound is preferably about 0.5 to 10 weight percent, or more preferably about 1 to 6 weight percent, of the polyphenylene sulfide resin. The titanium or zirconium organometallic compound disclosed in the present invention can also be used in reinforced polyphenylene sulfide composite. When used in a polyphenylene sulfide composite, the amount of the titanium or zirconium organometallic compound is preferably about 0.5 to 10 weight percent, or more preferably about 1 to 6 weight percent, of the composite, and the amount of the reinforcement material is preferably about 5 to 60 weight percent, or more preferably about 10 to 50 weight percent, of the reinforced composite.

Nucleating agent such as silica, talc, mica or kaolin can also be used cooperatively with the composition disclosed in the present invention. The amount of the titanium or zirconium organometallic compound is preferably about 0.5 to 10 weight percent, or more preferably about 1 to 6 weight percent of the total composition. The amount of the nucleating agent is preferably about 0.3 to 6 weight percent, or more preferably 0.5 to 5 percent of the total composition.

DETAILED DESCRIPTION OF THE PREFERRED EMBODIMENTS

The present invention will now be described more specifically with reference to the following examples. It is to be noted that the following descriptions of examples including preferred embodiments of this invention are presented herein for purpose of illustration and description; it is not intended to be exhaustive or to limit the invention to the precise form disclosed.

EXAMPLE 1

A modified polyphenylene sulfide resin containing 3 wt % titanium organometallic compound and 97 wt % of a molten polyphenylene sulfide resin was prepared. The titanium organometallic compound, which is designated as Organometallic Compound (I), has the following structure:

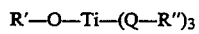

wherein:
  R' is an alkyl group having three carbons,
  Q is a SO$_3$ group,
  R" is represented by the following formula:

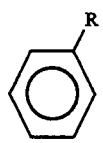

wherein R is an alkyl group, $C_{n'}H_{2n'+1}$, $n' = 12'$.

The molten polyphenylene sulfide resin had a viscosity of 1,800 poise (measured at a temperature of 310° C. and a shear rate of 100 sec$^{-1}$). The modified polyphenylene sulfide was compounded with a Werner & Pfleider twin-screw extruder (Model ZSK-30). The temperature of the screw die was maintained at 315° C. After the modified polyphenylene sulfide composition was evenly compounded, it was pelletized, dried, cooled, and monitored with a Perkin-Elmer differential scanning calorimeter (Model DSC-7) to study the crystallization rate by measuring the isothermal crystallization time and crystallization temperature.

Isothermal crystallization time is defined as the time required for the polyphenylene sulfide sample to crystalize at a given temperature, after the sample was quickly cooled to that given temperature. During the differential scanning calorimetry study, the polyphenylene sulfide sample was heated to a temperature of 310° C., remained there for 3 minutes. Then the sample was quickly cooled at a rate of 200° C./min to a pre-determined temperature of 250° C. and maintained at 250° C. for 10 minutes. The isothermal crystallization time was determined from the differential scanning calorimetry curve. A lower value of isothermal crystallization time indicates a more rapid crystallizing rate.

Crystallization temperature is defined as the temperature at which an exothermic peak was observed in the differential scanning calorimetry study under an isothermal cooling condition. The temperature of the polyphenylene sulfide sample was first raised to 310° C., and remained there for 3 minutes. The sample was cooled at a rate of 10° C./min to 50° C., and monitor with a differential scanning calorimeter. A higher value of crystallization temperature indicates a more rapid crystallizing rate, which is a desirable characteristic in the fabrication of the polyphenylene sulfide resin.

Results of the isothermal crystallization time and the crystallization temperature are summarized in Table 1.

Comparative Example 1

A polyphenylene sulfide sample was prepared and tested using the same procedure as described in Example 1, except that the test sample did not contain the titanium organometallic compound. Results of the isothermal crystallization time and the crystallization temperature for this comparative sample are also summarized in Table 1.

From Table 1, it is evident that the addition of the titanium organometallic compound significantly improves both the isothermal crystallization time and the crystallization temperature of the polyphenylene sulfide resin. The isothermal crystallization time (at 250° C.) was substantially decreased from 175.2 seconds to 105.8 seconds, and the crystallization temperature was increased by 8.09° C., with the addition of titanium organometallic compound.

EXAMPLE 2

A polyphenylene sulfide sample was prepared and tested using the same procedure as described in Example 1, except that the test sample further contained 1 wt % of talc, a nucleating agent, and that the amount of the polyphenylene sulfide was reduced to 96%. Results of the isothermal crystallization time and the crystallization temperature for this sample are summarized in Table 2.

EXAMPLE 3

A polyphenylene sulfide sample was prepared and tested using the same procedure as described in Example 2, except that the test sample contained a different organometallic compound, represented by the following formula:

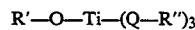

wherein:
  R' is an alkyl group represented by the following formula:

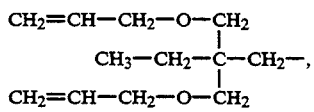

Q is a SO₃ group,
R″ is an alkyl group, $C_{n'}H_{2n'+1}$, $n'=12$

The organometallic compound described above is designated as Organometallic Compound (II). Results of the isothermal crystallization time and the crystallization temperature for this sample are summarized in Table 2.

Comparative Example 2

A polyphenylene sulfide sample was prepared and tested using the same procedure as described in Example 2, except that the test sample did not contain the organometallic compound. Results of the isothermal crystallization time and the crystallization temperature for this comparative sample are also summarized in Table 2.

From Table 2, it is evident that the addition of the titanium organometallic compound significantly improves both the isothermal crystallization time and the crystallization temperature of the polyphenylene sulfide resin, even in the presence of a nucleating agent. Combining Tables 1 and 2, it is shown that the addition of the nucleating agent disclosed in the prior art reduced the isothermal crystallization time (at 250° C.) by only 23.4 seconds. With the addition of the organometallic compounds of the present invention, the isothermal crystallization time was further reduced by 51 seconds and 38.4 seconds, in Examples 2 and 3, respectively. The crystallization temperatures were also increased by 8.41 and 5.3° C., respectively.

EXAMPLE 4

A sample of reinforced polyphenylene sulfide composite was prepared and tested using the same procedure as described in Example 1, except that the test sample had a composition that contained 58.9 wt % polyphenylene sulfide, 39.3 wt % glass fiber, and 1.8 wt % of the same titanium organometallic compound, as shown in Table 3. Results of the isothermal crystallization time and the crystallization temperature for this sample are summarized in Table 3.

EXAMPLE 5

A sample of reinforced polyphenylene sulfide composite was prepared and tested using the same procedure as described in Example 4, except that the test sample had a composition that contained 58.6 wt % polyphenylene sulfide, 39.1 wt % glass fiber, 0.5 wt % of a nucleating agent talc, and 1.8 wt % of the same titanium organometallic compound, as shown in Table 3. Results of the isothermal crystallization time and the crystallization temperature for this sample are summarized in Table 3.

EXAMPLE 6

A sample of reinforced polyphenylene sulfide composite was prepared and tested using the same procedure as described in Example 4, except that the test sample had a composition that contained 59.3 wt % polyphenylene sulfide, 39.5 wt % glass fiber, 0.6 wt % of a nucleating agent talc, and 0.6 wt % of the same titanium organometallic compound, as shown in Table 3. Results of the isothermal crystallization time and the crystallization temperature for this sample are summarized in Table 3.

Comparative Example 3

A sample of reinforced polyphenylene sulfide composite was prepared and tested using the same procedure as described in Example 4, except that the test sample did not contain the titanium organometallic compound and had a composition that contained 60.0 wt % polyphenylene sulfide and 40.0 wt % glass fiber. The composition of the Comparative Example 3 is shown in Table 3. Results of the isothermal crystallization time and the crystallization temperature for this sample are summarized in Table 3.

Comparative Example 4

A sample of reinforced polyphenylene sulfide composite was prepared and tested using the same procedure as described in Comparative Example 3, except that the test sample contained a nucleating agent talc and had a composition that contained 59.6 wt % polyphenylene sulfide 39.8 wt % glass fiber and 0.6 wt % nucleating agent. The composition of the Comparative Example 4 is shown in Table 3. Results of the isothermal crystallization time and the crystallization temperature for this sample are summarized in Table 3.

Table 3 further demonstrates the substantially improved crystallizing characteristic of the polyphenylene sulfide of the present invention when used in reinforced composites. Comparing Example 4 and Comparative Example 3, the isothermal crystallization time was reduced by 106.2 seconds (from 213.6 seconds to 107.4 seconds), and the crystallization temperature was raised by 6.65° C., with the addition of 1.8% of the titanium organometallic compound. Comparing Comparative Examples 3 and 4, the isothermal crystallization time was reduced by 51.6 seconds, and the crystallization temperature was raised by 3.19° C., with the addition of 0.6% of a nucleating agent as disclosed in the prior art.

The advantage of the present invention over the prior art composition can also be illustrated by comparing Examples 5 and 6 and Comparative Example 4. Table 3 shows that with the addition of 1.8 wt % and 0.6 wt % the titanium organometallic compound disclosed in the present invention, the isothermal crystallization times were further reduced by 62.4 seconds and 27.6 seconds, respectively. The crystallization temperatures were raised by 4.38° and 1.87° C., respectively.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

TABLE 1

|  | Example 1 | Comparative Example 1 |
|---|---|---|
| Wt % of PPS Resin | 97.0 | 100.0 |
| Wt % of Organometallic Compound | 3.0 | 0.0 |
| Crystallization Temperature (°C.) | 246.81 | 238.72 |
| Crystallization Time (seconds) | 105.8 | 175.2 |

TABLE 2

|  | Example 2 | Example 3 | Comparative Example 2 |
|---|---|---|---|
| Wt % of PPS Resin | 96.0 | 96.0 | 99.0 |
| Wt % of Organometallic Compound (I) | 3.0 | 0.0 | 0.0 |
| Wt % of Organometallic Compound (II) | 0.0 | 3.0 | 0.0 |
| Wt % of Nucleating Agent (Talc) | 1.0 | 1.0 | 1.0 |
| Crystallization Temperature (°C.) | 248.22 | 245.11 | 239.81 |
| Crystallization Time (seconds) | 100.8 | 113.4 | 151.8 |

TABLE 3

|  | Example 4 | Example 5 | Example 6 | Comparative Example 3 | Comparative Example 4 |
|---|---|---|---|---|---|
| Wt % of PPS Resin | 58.9 | 58.5 | 59.3 | 60.0 | 59.6 |
| Wt % of Glass Fiber | 39.3 | 39.1 | 39.5 | 40.0 | 39.8 |
| Wt % of Nucleating Agent | 0 | 0.6 | 0.6 | 0 | 0.6 |
| Wt % of Organometallic Compound (I) | 1.8 | 1.8 | 0.6 | 0 | 0 |
| Crystallization Temperature (°C.) | 246.11 | 247.03 | 244.52 | 239.46 | 242.65 |
| Crystallization Time (seconds) | 107.4 | 99.6 | 134.4 | 213.6 | 162.0 |

What is claimed is:

1. A rapidly crystallizing polyphenylene sulfide composition or composite prepared therefrom, comprising:
   (a) a polyphenylene sulfide represented by the following formula:

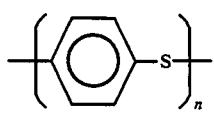

(b) an organometallic compound represented by the following formula:

R'—O—M—(Q—R")$_3$ wherein:
   M is either titanium or zirconium;
   R' is a substituted or un-substituted alkyl group having a carbon number of 1 to 30;
   Q is an SO$_3$ group; and
   R" is an alkyl group having a carbon number of 1 to 25, or an aryl-alkyl group represented by the following formula:

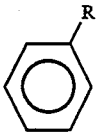

wherein R is an alkyl group having a carbon number of 1 to 25.

2. A rapidly crystallizing polyphenylene sulfide composition according to claim 1 wherein said R' is selected from the group consisting of:

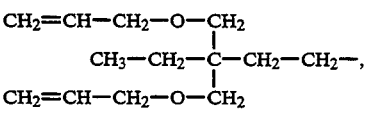

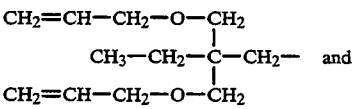   and

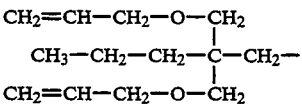

3. A rapidly crystallizing polyphenylene sulfide composition according to claim 1 wherein said organometallic compound is about 0.5 to 10 weight percent of total composition.

4. A rapidly crystallizing polyphenylene sulfide composition according to claim 1 wherein said organometallic compound is about 1 to 6 weight percent of total composition.

5. A rapidly crystallizing polyphenylene sulfide composition according to claim 1 which further comprises a nucleating agent selected from the group consisting of silicon dioxide, kaolin, mica, talc, and whisker.

6. A rapidly crystallizing polyphenylene sulfide composition according to claim 4 wherein said nucleating agent is about 0.5 to 10 weight percent of total composition.

7. A rapidly crystallizing polyphenylene sulfide composition according to claim 4 wherein said nucleating agent is about 1 to 6 weight percent of total composition.

8. A rapidly crystallizing polyphenylene sulfide composition according to claim 1 which further comprises 5 to 60 weight percent of a reinforcement material.

9. A rapidly crystallizing polyphenylene sulfide composition according to claim 8 wherein said reinforcement material is a glass fiber.

10. A rapidly crystallizing polyphenylene sulfide composition according to claim 8 wherein said organometallic compound is about 0.5 to 10 weight percent of total composition.

11. A rapidly crystallizing polyphenylene sulfide composition according to claim 8 wherein said organometallic compound is about 1 to 6 weight percent of total composition.

12. A rapidly crystallizing polyphenylene sulfide composition according to claim 1 wherein said organometallic compound is an organotitanium compound.

13. A rapidly crystallizing polyphenylene sulfide composition according to claim 1 wherein said organometallic compound is an organozirconium compound.

14. A reinforced polyphenylene sulfide composite comprising:
   (a) a polyphenylene sulfide as described in claim 1;
   (b) an organometallic compound as described in claim 1;
   (c) a nucleating agent; and
   (d) a reinforcement material.

15. A reinforced polyphenylene sulfide composite according to claim 12 wherein the proportions of said organometallic compound, nucleating, and reinforcement material are 0.5-10%, 0.3-6%, and 5-60%, respectively.

16. A reinforced polyphenylene sulfide composite according to claim 12 wherein the proportions of said organometallic compound, nucleating, and reinforcement material are 1-6%, 0.5-5%, and 10-50%, respectively.

17. A rapidly crystallizing polyphenylene sulfide composition according to claim 1 wherein said organometallic compound is an organotitanium compound.

18. A rapidly crystallizing polyphenylene sulfide composition according to claim 1 wherein said organometallic compound is an organozirconium compound.

* * * * *